(12) United States Patent
Vilc et al.

(10) Patent No.: US 8,355,242 B2
(45) Date of Patent: Jan. 15, 2013

(54) SOLID ELECTROLYTIC CAPACITOR ELEMENT

(75) Inventors: Ladislav Vilc, Lanskroun (CZ); Jan Petrzilek, Usti nad Orlici (CZ)

(73) Assignee: AVX Corporation, Fountain Inn, SC (US)

( * ) Notice: Subject to any disclaimer, the term of this patent is extended or adjusted under 35 U.S.C. 154(b) by 281 days.

(21) Appl. No.: 12/945,010

(22) Filed: Nov. 12, 2010

(65) Prior Publication Data

US 2012/0120556 A1    May 17, 2012

(51) Int. Cl.
*H01G 2/12* (2006.01)
*H01G 9/00* (2006.01)

(52) U.S. Cl. .................. 361/534; 361/528; 361/532

(58) Field of Classification Search .............. 361/523, 361/534, 539
See application file for complete search history.

(56) References Cited

U.S. PATENT DOCUMENTS

| | | | |
|---|---|---|---|
| 3,345,545 A | 10/1967 | Bourgault et al. | |
| 4,085,435 A | 4/1978 | Galvagni | |
| 4,344,107 A * | 8/1982 | Webber et al. | 361/529 |
| 4,363,079 A * | 12/1982 | Sekido et al. | 361/502 |
| 4,945,452 A | 7/1990 | Sturmer et al. | |
| 4,972,299 A | 11/1990 | Hagiwara et al. | |
| 5,099,397 A * | 3/1992 | Edson et al. | 361/534 |
| 5,111,327 A | 5/1992 | Blohm et al. | |
| 5,198,968 A | 3/1993 | Galvagni | |
| 5,357,399 A | 10/1994 | Salisbury | |
| 5,390,074 A | 2/1995 | Hasegawa et al. | |
| 5,394,295 A | 2/1995 | Galvagni et al. | |
| 5,495,386 A | 2/1996 | Kulkarni | |
| 5,729,428 A | 3/1998 | Sakata et al. | |
| 5,930,109 A | 7/1999 | Fishler | |
| 5,949,639 A | 9/1999 | Maeda et al. | |
| 6,191,936 B1 | 2/2001 | Webber et al. | |
| 6,197,252 B1 | 3/2001 | Bishop et al. | |
| 6,236,561 B1 | 5/2001 | Ogino et al. | |
| 6,262,878 B1 | 7/2001 | Shirashige et al. | |
| 6,322,912 B1 | 11/2001 | Fife | |
| 6,391,275 B1 | 5/2002 | Fife | |

(Continued)

FOREIGN PATENT DOCUMENTS

EP    1209706 A2    5/2002

(Continued)

*Primary Examiner* — Eric Thomas
(74) *Attorney, Agent, or Firm* — Dority & Manning, P.A.

(57) ABSTRACT

A solid electrolytic capacitor element that is capable of withstanding laser welding without a significant deterioration in its electrical performance is provided. The capacitor element contains an anode body, dielectric, and solid electrolyte. To help shield the solid electrolyte from damage that might otherwise occur during manufacture of the capacitor, a multi-layered protective coating is employed in the present invention that overlies at least a portion of the solid electrolyte. More particularly, the protective coating includes a light reflective layer overlying the solid electrolyte and a stress dissipation layer overlying the light reflective layer. The light reflective layer can help reflect any light that inadvertently travels toward the capacitor during, for example, laser welding. This results in reduced contact of the solid electrolyte with the laser and thus minimizes defects in the electrolyte that would have otherwise been formed by carbonization. The stress dissipation layer can likewise help to dissipate stresses experienced by the capacitor (e.g., during encapsulation, reflow, etc.) so that they are not as likely to cause damage to the solid electrolyte. The stress dissipation layer can also be relatively porous in nature so that humidity trapped in the capacitor can escape and diminish the pressure that might otherwise be transferred to the solid electrolyte.

33 Claims, 4 Drawing Sheets

U.S. PATENT DOCUMENTS

| | | |
|---|---|---|
| 6,400,556 B1 | 6/2002 | Masuda et al. |
| 6,416,730 B1 | 7/2002 | Fife |
| 6,430,034 B2 | 8/2002 | Sano et al. |
| 6,459,566 B1 | 10/2002 | Casby et al. |
| 6,467,142 B1 | 10/2002 | Shirashige et al. |
| 6,477,030 B2 | 11/2002 | Hidaka et al. |
| 6,504,705 B2 | 1/2003 | Shimada et al. |
| 6,519,135 B2 | 2/2003 | Sano et al. |
| 6,527,937 B2 | 3/2003 | Fife |
| 6,576,099 B2 | 6/2003 | Kimmel et al. |
| 6,592,740 B2 | 7/2003 | Fife |
| 6,616,713 B2 | 9/2003 | Sano et al. |
| 6,625,009 B2 | 9/2003 | Maeda |
| 6,635,729 B1 | 10/2003 | Groenendaal et al. |
| 6,639,787 B2 | 10/2003 | Kimmel et al. |
| 6,674,635 B1 | 1/2004 | Fife et al. |
| 6,687,118 B1 | 2/2004 | O'Phelan et al. |
| 6,717,793 B2 | 4/2004 | Arai et al. |
| 6,751,086 B2 | 6/2004 | Matsumoto |
| 6,808,541 B2 | 10/2004 | Maeda |
| 6,845,003 B2 | 1/2005 | Oyama et al. |
| 6,870,727 B2 | 3/2005 | Edson et al. |
| 6,870,728 B1 | 3/2005 | Buret et al. |
| 6,882,521 B2 | 4/2005 | Tsutsui et al. |
| 6,891,717 B2 | 5/2005 | Fujii et al. |
| 6,903,921 B2 | 6/2005 | Ishijima |
| 6,903,922 B2 | 6/2005 | Sano et al. |
| 6,906,912 B2 | 6/2005 | Arai et al. |
| 6,920,037 B2 | 7/2005 | Sano et al. |
| 6,954,351 B2 | 10/2005 | Konuma et al. |
| 6,970,345 B2 | 11/2005 | Oh et al. |
| 6,987,663 B2 | 1/2006 | Merker et al. |
| 6,992,880 B2 | 1/2006 | Tadanobu et al. |
| 6,995,972 B2 | 2/2006 | Fujii et al. |
| 7,027,291 B2 | 4/2006 | Horio et al. |
| 7,057,882 B2 | 6/2006 | Fujii et al. |
| 7,116,548 B2 | 10/2006 | Satterfield, Jr. et al. |
| 7,220,397 B2 | 5/2007 | Kimmel et al. |
| 7,262,511 B2 | 8/2007 | Osako et al. |
| 7,341,705 B2 | 3/2008 | Schnitter |
| 7,381,396 B2 | 6/2008 | Thomas et al. |
| 7,419,926 B2 | 9/2008 | Schnitter et al. |
| 7,443,653 B2 | 10/2008 | Kim et al. |
| 7,724,502 B2 | 5/2010 | Petržílek et al. |
| 2002/0167786 A1 | 11/2002 | Sano et al. |
| 2006/0038304 A1 | 2/2006 | Osako et al. |
| 2010/0229361 A1 | 9/2010 | Petržílek et al. |

FOREIGN PATENT DOCUMENTS

| | | | |
|---|---|---|---|
| EP | 1209706 A3 | | 5/2002 |
| JP | 8186061 A | | 7/1996 |
| JP | 2006032382 A | | 2/2006 |
| JP | 2009065179 A | * | 3/2009 |

* cited by examiner

SOLID ELECTROLYTIC CAPACITOR ELEMENT

BACKGROUND OF THE INVENTION

Conventional solid electrolytic capacitors contain an anode body, dielectric layer, and a solid electrolyte. An anode wire projects from a surface of the capacitor for electrically connecting the anode body to a termination. One beneficial technique that is sometimes employed to connect the anode wire to the termination is laser welding. Lasers generally contain resonators that include a laser medium capable of releasing photons by stimulated emission and an energy source that excites the elements of the laser medium. The energy source may provide continuous energy to the laser medium to emit a continuous laser beam or energy discharges to emit a pulsed laser beam. One type of suitable laser is one in which the laser medium consists of an aluminum and yttrium garnet (YAG), doped with neodymium (Nd) and the excited particles are neodymium ions $Nd^{3+}$. Such lasers typically emit light at a wavelength of about 1064 nanometers in the infrared spectrum. Unfortunately, problems are often experienced when attempting to laser weld capacitors for small case sizes. Namely, the small case size requires that the laser be positioned relatively close to the location of the anode wire and termination. At such a close location, however, the laser can be readily deflected by the wire or anode termination and come into contact with the solid electrolyte of the capacitor. Due to its high energy, the deflected laser beam can significantly increase the temperature of the solid electrolyte to a point where it begins to carbonize. The carbonized portions of the solid electrolyte come into a contact with a dielectric layer and may thus lead to poor electrical properties (e.g., high leakage current) in the resulting capacitor.

As such, a need exists for solid electrolytic capacitors that can be laser welded and yet retain excellent properties.

SUMMARY OF THE INVENTION

In accordance with one embodiment of the present invention, a solid electrolytic capacitor element is disclosed that comprises an anode body containing a valve metal composition, a dielectric overlying the anode body, a solid electrolyte overlying the dielectric, and a multi-layered protective coating that includes a light reflective layer and a stress dissipation layer. The light reflective layer overlies the solid electrolyte and the stress dissipation layer overlies the light reflective layer. The light reflective layer contains a plurality of non-metallic reflective particles, and the stress dissipation layer includes a plurality of metal particles. In certain embodiments, the capacitor element may also include an external coating (e.g., carbonaceous layer and silver layer) that is positioned between the solid electrolyte and the multi-layered protective coating.

Other features and aspects of the present invention are set forth in greater detail below.

BRIEF DESCRIPTION OF THE DRAWINGS

A full and enabling disclosure of the present invention, including the best mode thereof, directed to one of ordinary skill in the art, is set forth more particularly in the remainder of the specification, which makes reference to the appended figures in which.

Repeat use of references characters in the present specification and drawings is intended to represent same or analogous features or elements of the invention.

DETAILED DESCRIPTION OF REPRESENTATIVE EMBODIMENTS

It is to be understood by one of ordinary skill in the art that the present discussion is a description of exemplary embodiments only, and is not intended as limiting the broader aspects of the present invention, which broader aspects are embodied in the exemplary construction.

Generally speaking, the present invention is directed to a solid electrolytic capacitor element that is capable of withstanding laser welding without a significant deterioration in its electrical performance. The capacitor element contains an anode body, dielectric, and solid electrolyte. To help shield the solid electrolyte from damage that might otherwise occur during manufacture of the capacitor, a multi-layered protective coating is employed in the present invention that overlies at least a portion of the solid electrolyte. More particularly, the protective coating includes a light reflective layer overlying the solid electrolyte and a stress dissipation layer overlying the light reflective layer. The light reflective layer can help reflect any light that inadvertently travels toward the capacitor during, for example, laser welding. This results in reduced contact of the solid electrolyte with the laser and thus minimizes defects in the electrolyte that would have otherwise been formed by carbonization. The stress dissipation layer can likewise help to dissipate stresses experienced by the capacitor (e.g., during encapsulation, reflow, etc.) so that they are not as likely to cause damage to the solid electrolyte. The stress dissipation layer can also be relatively porous in nature so that humidity trapped in the capacitor can escape and diminish the pressure that might otherwise be transferred to the solid electrolyte. The resulting capacitor is therefore characterized by such performance characteristics as relatively low ESR and low leakage currents.

Various embodiments of the present invention will now be described in more detail.

I. Anode

The anode of the solid electrolytic capacitors may be formed from a valve metal composition having a specific charge broadly ranging from about 2,000 μF*V/g to about 700,000 μF*V/g, in some embodiments from about 5,000 to about 300,000 μF*V/g or more, and in some embodiments, from about 20,000 to about 200,000 μF*V/g. The valve metal composition contains a valve metal (i.e., metal that is capable of oxidation) or valve metal-based compound, such as tantalum, niobium, aluminum, hafnium, titanium, alloys thereof, oxides thereof, nitrides thereof, and so forth. For example, the valve metal composition may contain an electrically conductive oxide of niobium, such as niobium oxide having an atomic ratio of niobium to oxygen of 1:1.0±1.0, in some embodiments 1:1.0±0.3, in some embodiments 1:1.0±0.1, and in some embodiments, 1:1.0±0.05. For example, the niobium oxide may be $NbO_{0.7}$, $NbO_{1.0}$, $NbO_{1.1}$, and $NbO_2$. In a preferred embodiment, the composition contains $NbO_{1.0}$, which is a conductive niobium oxide that may remain chemically stable even after sintering at high temperatures. Examples of such valve metal oxides are described in U.S. Pat. No. 6,322,912 to Fife; U.S. Pat. No. 6,391,275 to Fife et al.; U.S. Pat. No. 6,416,730 to Fife et al.; U.S. Pat. No. 6,527,937 to Fife; U.S. Pat. No. 6,576,099 to Kimmel, et al.; U.S. Pat. No. 6,592,740 to Fife, et al.; and U.S. Pat. No. 6,639,787 to Kimmel, et al.; and U.S. Pat. No. 7,220,397 to Kimmel, et al., as well as U.S. Patent Application Publication Nos. 2005/0019581 to Schnitter; 2005/0103638 to Schnitter, et al.; 2005/0013765 to Thomas, et al., all of which are incorporated herein in their entirety by reference thereto for all purposes.

Conventional fabricating procedures may generally be utilized to form the anode body. In one embodiment, a tantalum or niobium oxide powder having a certain particle size is first selected. For example, the particles may be flaked, angular, nodular, and mixtures or variations thereof. The particles also typically have a screen size distribution of at least about 60 mesh, in some embodiments from about 60 to about 325 mesh, and in some embodiments, from about 100 to about 200 mesh. Further, the specific surface area is from about 0.1 to about 10.0 $m^2/g$, in some embodiments from about 0.5 to about 5.0 $m^2/g$, and in some embodiments, from about 1.0 to about 2.0 $m^2/g$. The term "specific surface area" refers to the surface area determined by the physical gas adsorption (B.E.T.) method of Bruanauer, Emmet, and Teller, Journal of American Chemical Society, Vol. 60, 1938, p. 309, with nitrogen as the adsorption gas. Likewise, the bulk (or Scott) density is typically from about 0.1 to about 5.0 $g/cm^3$, in some embodiments from about 0.2 to about 4.0 $g/cm^3$, and in some embodiments, from about 0.5 to about 3.0 $g/cm^3$.

To facilitate the construction of the anode body, other components may be added to the electrically conductive particles. For example, the electrically conductive particles may be optionally mixed with a binder and/or lubricant to ensure that the particles adequately adhere to each other when pressed to form the anode body. Suitable binders may include camphor, stearic and other soapy fatty acids, Carbowax (Union Carbide), Glyptal (General Electric), naphthalene, vegetable wax, microwaxes (purified paraffins), polymer binders (e.g., polyvinyl alcohol, polyethyl-2-oxazoline), etc), and so forth. The binder may be dissolved and dispersed in a solvent. Exemplary solvents may include water, alcohols, and so forth. When utilized, the percentage of binders and/or lubricants may vary from about 0.1% to about 8% by weight of the total mass. It should be understood, however, that binders and lubricants are not required in the present invention.

The resulting powder may be compacted using any conventional powder press mold. For example, the press mold may be a single station compaction press using a die and one or multiple punches. Alternatively, anvil-type compaction press molds may be used that use only a die and single lower punch. Single station compaction press molds are available in several basic types, such as cam, toggle/knuckle and eccentric/crank presses with varying capabilities, such as single action, double action, floating die, movable platen, opposed ram, screw, impact, hot pressing, coining or sizing. If desired, any binder/lubricant may be removed after compression by heating the pellet under vacuum at a certain temperature (e.g., from about 150° C. to about 500° C.) for several minutes. Alternatively, the binder/lubricant may also be removed by contacting the pellet with an aqueous solution, such as described in U.S. Pat. No. 6,197,252 to Bishop, et al., which is incorporated herein in its entirety by reference thereto for all purposes.

The thickness of the pressed anode body may be relatively thin, such as about 4 millimeters or less, in some embodiments, from about 0.05 to about 2 millimeters, and in some embodiments, from about 0.1 to about 1 millimeter. The shape of the anode body may also be selected to improve the electrical properties of the resulting capacitor. For example, the anode body may have a shape that is curved, sinusoidal, rectangular, U-shaped, V-shaped, etc. The anode body may also have a "fluted" shape in that it contains one or more furrows, grooves, depressions, or indentations to increase the surface to volume ratio to minimize ESR and extend the frequency response of the capacitance. Such "fluted" anodes are described, for instance, in U.S. Pat. No. 6,191,936 to Webber, et al.; U.S. Pat. No. 5,949,639 to Maeda, et al.; and U.S. Pat. No. 3,345,545 to Bourqault et al., as well as U.S. Patent Application Publication No, 2005/0270725 to Hahn, et al., all of which are incorporated herein in their entirety by reference thereto for all purposes.

If desired, an anode lead may also be attached to the anode body. The anode lead may be in the form of a wire, sheet, etc., and may be formed from a valve metal compound, such as tantalum, niobium, niobium oxide, etc. Attachment of the lead may be accomplished using known techniques, such as by welding the lead to the body or embedding it within the anode body during formation.

The anode is also coated with a dielectric. The dielectric may be formed by anodically oxidizing ("anodizing") the sintered anode so that a dielectric layer is formed over and/or within the anode. For example, a tantalum (Ta) anode may be anodized to tantalum pentoxide ($Ta_2O_5$). Typically, anodization is performed by initially applying a solution to the anode, such as by dipping anode into the electrolyte. A solvent is generally employed, such as water (e.g., deionized water). To enhance ionic conductivity, a compound may be employed that is capable of dissociating in the solvent to form ions. Examples of such compounds include, for instance, acids, such as described below with respect to the electrolyte. For example, an acid (e.g., phosphoric acid) may constitute from about 0.01 wt. % to about 5 wt. %, in some embodiments from about 0.05 wt. % to about 0.8 wt. %, and in some embodiments, from about 0.1 wt. % to about 0.5 wt. % of the anodizing solution. If desired, blends of acids may also be employed.

A current is passed through the anodizing solution to form the dielectric layer. The value of the formation voltage manages the thickness of the dielectric layer. For example, the power supply may be initially set up at a galvanostatic mode until the required voltage is reached. Thereafter, the power supply may be switched to a potentiostatic mode to ensure that the desired dielectric thickness is formed over the entire surface of the anode. Of course, other known methods may also be employed, such as pulse or step potentiostatic methods. The voltage at which anodic oxidation occurs typically ranges from about 4 to about 250 V, and in some embodiments, from about 9 to about 200 V, and in some embodiments, from about 20 to about 150 V. During oxidation, the anodizing solution can be kept at an elevated temperature, such as about 30° C. or more, in some embodiments from about 40° C. to about 200° C., and in some embodiments, from about 50° C. to about 100° C. Anodic oxidation can also be done at ambient temperature or lower. The resulting dielectric layer may be formed on a surface of the anode and within its pores.

II. Cathode

As indicated above, a solid electrolyte overlies the dielectric that generally functions as the cathode for the capacitor. The solid electrolyte may be formed from a variety of materials known in the art, such as inorganic materials (e.g., manganese dioxide) or organic materials (e.g., conductive polymers, 7,7',8,8'-tetracyanoquinodimethane ("TCNQ") complexes, etc.). In one particular embodiment, a conductive polymer is employed as the solid electrolyte. Typically, such conductive polymer(s) are π-conjugated and have an intrinsic electrical conductivity after oxidation or reduction, such as an electrical conductivity of at least about 1 μS cm$^{-1}$ after oxidation. Examples of such π-conjugated conductive polymers include, for instance, polyheterocycles (e.g., polypyrroles, polythiophenes, polyanilines, etc.), polyacetylenes, poly-p-phenylenes, polyphenolates, and so forth. Particularly suitable conductive polymers are substituted polythiophenes having the following general structure:

wherein,

T is O or S;

D is an optionally substituted $C_1$ to $C_5$ alkylene radical (e.g., methylene, ethylene, n-propylene, n-butylene, n-pentylene, etc.);

$R_7$ is a linear or branched, optionally substituted $C_1$ to $C_{18}$ alkyl radical (e.g., methyl, ethyl, n- or iso-propyl, n-, iso-, sec- or tert-butyl, n-pentyl, 1-methylbutyl, 2-methylbutyl, 3-methylbutyl, 1-ethylpropyl, 1,1-dimethylpropyl, 1,2-dimethylpropyl, 2,2-dimethylpropyl, n-hexyl, n-heptyl, n-octyl, 2-ethylhexyl, n-nonyl, n-decyl, n-undecyl, n-dodecyl, n-tridecyl, n-tetradecyl, n-hexadecyl, n-octadecyl, etc.); optionally substituted $C_5$ to $C_{12}$ cycloalkyl radical (e.g., cyclopentyl, cyclohexyl, cycloheptyl, cyclooctyl, cyclononyl cyclodecyl, etc.); optionally substituted $C_6$ to $C_{14}$ aryl radical (e.g., phenyl, naphthyl, etc.); optionally substituted $C_7$ to $C_{18}$ aralkyl radical (e.g., benzyl, o-, m-, p-tolyl, 2,3-, 2,4-, 2,5-, 2-6, 3-4-, 3,5-xylyl, mesityl, etc.); optionally substituted $C_1$ to $C_4$ hydroxyalkyl radical, or hydroxyl radical; and q is an integer from 0 to 8, in some embodiments, from 0 to 2, and in one embodiment, 0; and n is from 2 to 5,000, in some embodiments from 4 to 2,000, and in some embodiments, from 5 to 1,000. Example of substituents for the radicals "D" or "$R_7$" include, for instance, alkyl, cycloalkyl, aryl, aralkyl, alkoxy, halogen, ether, thioether, disulphide, sulfoxide, sulfone, sulfonate, amino, aldehyde, keto, carboxylic acid ester, carboxylic acid, carbonate, carboxylate, cyano, alkylsilane and alkoxysilane groups, carboxylamide groups, and so forth.

Particularly suitable thiophene polymers are those in which "D" is an optionally substituted $C_2$ to $C_3$ alkylene radical. For instance, the polymer may be optionally substituted poly(3,4-ethylenedioxythiophene), which has the following general structure:

Methods for forming conductive polymers, such as described above, are well known in the art. For instance, U.S. Pat. No. 6,987,663 to Merker, et al., which is incorporated herein in its entirety by reference thereto for all purposes, describes various techniques for forming substituted polythiophenes from a monomeric precursor. The monomeric precursor may, for instance, have the following structure:

wherein,

T, D, $R_7$, and q are defined above. Particularly suitable thiophene monomers are those in which "D" is an optionally substituted $C_2$ to $C_3$ alkylene radical. For instance, optionally substituted 3,4-alkylenedioxythiophenes may be employed that have the general structure:

wherein, $R_7$ and q are as defined above. In one particular embodiment, "q" is 0. One commercially suitable example of 3,4-ethylenedioxythiophene is available from H.C. Starck GmbH under the designation CLEVIOS™ M. Other suitable monomers are also described in U.S. Pat. No. 5,111,327 to Blohm, at al. and U.S. Pat. No. 6,635,729 to Groenendaal, et al., which are incorporated herein in their entirety by reference thereto for all purposes. Derivatives of these monomers may also be employed that are, for example, dimers or trimers of the above monomers. Higher molecular derivatives, i.e., tetramers, pentamers, etc. of the monomers are suitable for use in the present invention. The derivatives may be made up of identical or different monomer units and used in pure form and in a mixture with one another and/or with the monomers. Oxidized or reduced forms of these precursors may also be employed.

The thiophene monomers are chemically polymerized in the presence of an oxidative catalyst. The oxidative catalyst may be a transition metal salt, such as a salt of an inorganic or organic acid that contain ammonium, sodium, gold, iron(III), copper(II), chromium(VI), cerium(IV), manganese(IV), manganese(VII), or ruthenium(III) cations. Particularly suitable transition metal salts include halides (e.g., $FeCl_3$ or $HAuCl_4$); salts of other inorganic acids (e.g., $Fe(ClO_4)_3$, $Fe_2$ $(SO_4)_3$, $(NH_4)_2S_2O_8$, or $Na_3Mo_{12}PO_{40}$); and salts of organic acids and inorganic acids comprising organic radicals. Examples of salts of inorganic acids with organic radicals include, for instance, iron(III) salts of sulfuric acid monoesters of $C_1$ to $C_{20}$ alkanols (e.g., iron(III) salt of lauryl sulfate). Likewise, examples of salts of organic acids include, for instance, iron(III) salts of $C_1$ to $C_{20}$ alkane sulfonic acids (e.g., methane, ethane, propane, butane, or dodecane sulfonic acid); iron (III) salts of aliphatic perfluorosulfonic acids (e.g., trifluoromethane sulfonic acid, perfluorobutane sulfonic acid, or perfluorooctane sulfonic acid); iron (III) salts of aliphatic $C_1$ to $C_{20}$ carboxylic acids (e.g., 2-ethylhexylcarboxylic acid); iron (III) salts of aliphatic perfluorocarboxylic acids (e.g., trifluoroacetic acid or perfluorooctane acid); iron (III) salts of aromatic sulfonic acids optionally substituted by $C_1$ to $C_{20}$ alkyl groups (e.g., benzene sulfonic acid, o-toluene sulfonic acid, p-toluene sulfonic acid, or dodecylbenzene sulfonic acid); iron (III) salts of cycloalkane sulfonic acids (e.g., camphor sulfonic acid); and so forth. Mixtures of these above-mentioned salts may also be used.

If desired, polymerization of the monomer may occur in a precursor solution. Solvents (e.g., polar protic or non-polar) may be employed in the solution, such as water, glycols (e.g., ethylene glycol, propylene glycol, butylene glycol, triethylene glycol, hexylene glycol, polyethylene glycols, ethoxydiglycol, dipropyleneglycol, etc.); glycol ethers (e.g., methyl glycol ether, ethyl glycol ether, isopropyl glycol ether, etc.); alcohols (e.g., methanol, ethanol, n-propanol, iso-propanol, and butanol); ketones (e.g., acetone, methyl ethyl ketone, and methyl isobutyl ketone); esters (e.g., ethyl acetate, butyl acetate, diethylene glycol ether acetate, methoxypropyl acetate, ethylene carbonate, propylene carbonate, etc.); amides (e.g., dimethylformamide, dimethylacetamide, dimethylcaprylic/capric fatty acid amide and N-alkylpyrrolidones); sulfoxides or sulfones (e.g., dimethyl sulfoxide (DMSO) and sulfolane); phenolic compounds (e.g., toluene, xylene, etc.), and so forth. Water is a particularly suitable solvent for the reaction. When employed, the total amount of solvents in the precursor solution may be from about 40 wt. % to about 90 wt. %, in some embodiments from about 50 wt. % to about 85 wt. %, and in some embodiments, from about 60 wt. % to about 80 wt. %.

Polymerization of the thiophene monomer generally occurs at a temperature of from about 10° C. to about 100° C., and in some embodiments, from about 15° C. to about 75° C. Upon completion of the reaction, known filtration techniques may be employed to remove any salt impurities. One or more washing steps may also be employed to purify the dispersion.

Various methods may be utilized to apply the solid electrolyte onto the anode part. In one embodiment, the oxidizing agent and monomeric precursor are applied, either sequentially or together, such that the polymerization reaction occurs in situ on the part. Suitable application techniques may include screen-printing, dipping, electrophoretic coating, and spraying, may be used to form a conductive polymer coating. As an example, the monomeric precursor (e.g., 3,4-ethylenedioxy-thiophene) may initially be mixed with the oxidizing agent to form a solution. One suitable oxidizing agent is CLEVIOS™ C, which is iron III toluene-sulfonate. CLEVIOS™ C is a commercially available catalyst for CLEVIOS™ M, which is 3,4-ethylene dioxythiophene, a PEDT monomer. Once the mixture is formed, the anode part may then be dipped into the solution so that the polymer forms on the surface of the anode part. Alternatively, the oxidizing agent and precursor may also be applied separately to the anode part. In one embodiment, for example, the oxidizing agent is dissolved in an organic solvent (e.g., butanol) and then applied to the anode part as a dipping solution. The anode part may then be dried to remove the solvent therefrom. Thereafter, the anode part may be dipped into a solution containing the appropriate monomer.

In addition to in situ application, the solid electrolyte may also be applied to the part in the form of a dispersion of pre-polymerized solid conductive polymer particles. Although their size may vary, it is typically desired that the particles possess a small diameter to increase the surface area available for adhering to the anode part. For example, the particles may have an average size of from about 1 to about 200 nanometers, in some embodiments from about 2 to about 100 nanometers, and in some embodiments, from about 4 to about 50 nanometers. The diameter of the particles may be determined using known techniques, such as by ultracentrifuge, laser diffraction, etc. The shape of the particles may likewise vary. In one particular embodiment, for instance, the particles are spherical in shape. However, it should be understood that other shapes are also contemplated by the present invention, such as plates, rods, discs, bars, tubes, irregular shapes, etc. The concentration of the particles in the dispersion may vary depending on the desired viscosity of the dispersion and the particular manner in which the dispersion is to be applied to the capacitor. Typically, however, the particles constitute from about 0.1 to about 10 wt. %, in some embodiments from about 0.4 to about 5 wt. %, and in some embodiments, from about 0.5 to about 4 wt. % of the dispersion.

If desired, the formation of the conductive polymer into a particulate form may be enhanced by using a separate counterion to counteract a charged conductive polymer (e.g., polythiophene). That is, the conductive polymer (e.g., polythiophene or derivative thereof) used in the solid electrolyte typically has a charge on the main polymer chain that is neutral or positive (cationic). Polythiophene derivatives, for instance, typically carry a positive charge in the main polymer chain. In some cases, the polymer may possess positive and negative charges in the structural unit, with the positive charge being located on the main chain and the negative charge optionally on the substituents of the radical "R", such as sulfonate or carboxylate groups. The positive charges of the main chain may be partially or wholly saturated with the optionally present anionic groups on the radicals "R." Viewed overall, the polythiophenes may, in these cases, be cationic, neutral or even anionic. Nevertheless, they are all regarded as cationic polythiophenes as the polythiophene main chain has a positive charge.

The counterion may be a monomeric or polymeric anion. Polymeric anions can, for example, be anions of polymeric carboxylic acids (e.g., polyacrylic acids, polymethacrylic acid, polymaleic acids, etc.); polymeric sulfonic acids (e.g., polystyrene sulfonic acids ("PSS"), polyvinyl sulfonic acids, etc.); and so forth. The acids may also be copolymers, such as copolymers of vinyl carboxylic and vinyl sulfonic acids with other polymerizable monomers, such as acrylic acid esters and styrene. Likewise, suitable monomeric anions include, for example, anions of $C_1$ to $C_{20}$ alkane sulfonic acids (e.g., dodecane sulfonic acid); aliphatic perfluorosulfonic acids (e.g., trifluoromethane sulfonic acid, perfluorobutane sulfonic acid or perfluorooctane sulfonic acid); aliphatic $C_1$ to $C_{20}$ carboxylic acids (e.g., 2-ethyl-hexylcarboxylic acid); aliphatic perfluorocarboxylic acids (e.g., trifluoroacetic acid or perfluorooctanoic acid); aromatic sulfonic acids optionally substituted by $C_1$ to $C_{20}$ alkyl groups (e.g., benzene sulfonic acid, o-toluene sulfonic acid, p-toluene sulfonic acid or dodecylbenzene sulfonic acid); cycloalkane sulfonic acids (e.g., camphor sulfonic acid or tetrafluoroborates, hexafluorophosphates, perchlorates, hexafluoroantimonates, hexafluoroarsenates or hexachloroantimonates); and so forth. Particularly suitable counteranions are polymeric anions, such as a polymeric carboxylic or sulfonic acid (e.g., polystyrene sulfonic acid ("PSS")). The molecular weight of such polymeric anions typically ranges from about 1,000 to about 2,000,000, and in some embodiments, from about 2,000 to about 500,000.

When employed, the weight ratio of such counterions to conductive polymers in a given layer of the solid electrolyte is typically from about 0.5:1 to about 50:1, in some embodiments from about 1:1 to about 30:1, and in some embodiments, from about 2:1 to about 20:1. The weight of the electrically conductive polymers corresponds referred to the above-referenced weight ratios refers to the weighed-in portion of the monomers used, assuming that a complete conversion occurs during polymerization.

In addition to conductive polymer(s) and optional counterion(s), the dispersion may also contain one or more binders to further enhance the adhesive nature of the polymeric layer and also increase the stability of the particles within the dispersion. The binders may be organic in nature, such as polyvinyl alcohols, polyvinyl pyrrolidones, polyvinyl chlorides, polyvinyl acetates, polyvinyl butyrates, polyacrylic acid esters, polyacrylic acid amides, polymethacrylic acid esters, polymethacrylic acid amides, polyacrylonitriles, styrene/acrylic acid ester, vinyl acetate/acrylic acid ester and ethylene/vinyl acetate copolymers, polybutadienes, polyisoprenes, polystyrenes, polyethers, polyesters, polycarbonates, polyurethanes, polyamides, polyimides, polysulfones, melamine formaldehyde resins, epoxide resins, silicone resins or celluloses. Crosslinking agents may also be employed to enhance the adhesion capacity of the binders. Such crosslinking agents may include, for instance, melamine compounds, masked isocyanates or functional silanes, such as 3-glycidoxypropyltrialkoxysilane, tetraethoxysilane and tetraethoxysilane hydrolysate or crosslinkable polymers, such as polyurethanes, polyacrylates or polyolefins, and subsequent crosslinking.

Dispersion agents may also be employed to facilitate the formation of the solid electrolyte and the ability to apply it to the anode part. Suitable dispersion agents include solvents, such as aliphatic alcohols (e.g., methanol, ethanol, i-propanol and butanol), aliphatic ketones (e.g., acetone and methyl ethyl ketones), aliphatic carboxylic acid esters (e.g., ethyl acetate and butyl acetate), aromatic hydrocarbons (e.g., toluene and xylene), aliphatic hydrocarbons (e.g., hexane, heptane and cyclohexane), chlorinated hydrocarbons (e.g., dichloromethane and dichloroethane), aliphatic nitriles (e.g., acetonitrile), aliphatic sulfoxides and sulfones (e.g., dimethyl sulfoxide and sulfolane), aliphatic carboxylic acid amides (e.g., methylacetamide, dimethylacetamide and dimethylformamide), aliphatic and araliphatic ethers (e.g., diethylether and anisole), water, and mixtures of any of the foregoing solvents. A particularly suitable dispersion agent is water.

In addition to those mentioned above, still other ingredients may also be used in the dispersion. For example, conventional fillers may be used that have a size of from about 10 nanometers to about 100 micrometers, in some embodiments from about 50 nanometers to about 50 micrometers, and in some embodiments, from about 100 nanometers to about 30 micrometers. Examples of such fillers include calcium carbonate, silicates, silica, calcium or barium sulfate, aluminum hydroxide, glass fibers or bulbs, wood flour, cellulose powder carbon black, electrically conductive polymers, etc. The fillers may be introduced into the dispersion in powder form, but may also be present in another form, such as fibers.

Surface-active substances may also be employed in the dispersion, such as ionic or non-ionic surfactants. Furthermore, adhesives may be employed, such as organofunctional silanes or their hydrolysates, for example 3-glycidoxypropyltrialkoxysilane, 3-aminopropyl-triethoxysilane, 3-mercaptopropyl-trimethoxysilane, 3-metacryloxypropyltrimethoxysilane, vinyltrimethoxysilane or octyltriethoxysilane. The dispersion may also contain additives that increase conductivity, such as ether group-containing compounds (e.g., tetrahydrofuran), lactone group-containing compounds (e.g., γ-butyrolactone or γ-valerolactone), amide or lactam group-containing compounds (e.g., caprolactam, N-methylcaprolactam, N,N-dimethylacetamide, N-methylacetamide, N,N-dimethylformamide (DMF), N-methylformamide, N-methylformanilide, N-methylpyrrolidone (NMP), N-octylpyrrolidone, or pyrrolidone), sulfones and sulfoxides (e.g., sulfolane (tetramethylenesulfone) or dimethylsulfoxide (DMSO)), sugar or sugar derivatives (e.g., saccharose, glucose, fructose, or lactose), sugar alcohols (e.g., sorbitol or mannitol), furan derivatives (e.g., 2-furancarboxylic acid or 3-furancarboxylic acid), an alcohols (e.g., ethylene glycol, glycerol, di- or triethylene glycol).

The polymeric dispersion may be applied by to the part using a variety of known techniques, such as by spin coating, impregnation, pouring, dropwise application, injection, spraying, doctor blading, brushing, printing (e.g., ink-jet, screen, or pad printing), or dipping. Although it may vary depending on the application technique employed, the viscosity of the dispersion is typically from about 0.1 to about 100,000 mPas (measured at a shear rate of 100 s$^{-1}$), in some embodiments from about 1 to about 10,000 mPas, in some embodiments from about 10 to about 1,500 mPas, and in some embodiments, from about 100 to about 1000 mPas. Once applied, the layer may be dried and washed.

One benefit of employing a dispersion of conductive polymer particles, such as described above, is that it may be able to penetrate into the edge region of the capacitor body to contact and increase the adhesion to the dielectric. This results in a more mechanically robust part, which may reduce equivalent series resistance and leakage current. Such dispersions may also minimize the presence of ionic species (e.g., $Fe^{2+}$ or $Fe^{3+}$) produced during in situ polymerization, which can cause dielectric breakdown under high electric field due to ionic migration. Thus, by applying the conductive polymer as a dispersion rather through in situ polymerization, the resulting capacitor may exhibit a relatively high "breakdown voltage" (voltage at which the capacitor fails), such as about 60 volts or more, in some embodiments about 80 volts or more, in some embodiments about 100 volts or more, and in some embodiments, from about 120 volts to about 200 volts, as determined by increasing the applied voltage in increments of 3 volts until the leakage current reaches 1 mA.

If desired, the solid electrolyte may be formed from one or multiple layers. When multiple layers are employed, one or more of the layers may include a conductive polymer formed by in situ polymerization and/or as a dispersion. However, when it is desired to achieve very high breakdown voltages (e.g., from about 120 to 200 volts), the solid electrolyte is typically formed primarily from the polymeric dispersions described above, and is generally free of conductive polymers formed via in situ polymerization. Regardless of the number of layers employed, the resulting solid electrolyte typically has a total a thickness of from about 1 micrometer (μm) to about 200 μm, in some embodiments from about 2 μm to about 50 μm, and in some embodiments, from about 5 μm to about 30 μm.

The solid electrolyte may optionally be healed upon application to the anode part. Healing may occur after each application of a solid electrolyte layer or may occur after the application of the entire coating if multiple layers are employed. In some embodiments, for example, the solid electrolyte may be healed by dipping the pellet into an electrolyte solution, such as a solution of acid, and thereafter applying a constant voltage to the solution until the current is reduced to a preselected level. If desired, such healing may be accomplished in multiple steps. After application of some or all of the layers described above, the resulting part may then be washed if desired to remove various byproducts, excess oxidizing agents, and so forth. Further, in some instances, drying may be utilized after some or all of the dipping operations described above. For example, drying may be desired after applying the oxidizing agent and/or after washing the pellet in order to open the pores of the part so that it can receive a liquid during subsequent dipping steps.

In addition to the solid electrolyte, the cathode may also employ various other layers as is well known in the art. For example, the capacitor may employ a metal layer that overlies the solid electrolyte. The metal layer may act as a solderable conductor, contact layer, and/or charge collector for the capacitor, and may be formed from a conductive metal, such as copper, nickel, silver, nickel, zinc, tin, palladium, lead, copper, aluminum, molybdenum, titanium, iron, zirconium, magnesium, and alloys thereof. Silver is a particularly suitable conductive metal for use in the layer. If desired, a carbonaceous layer may be included in the cathode and positioned between the solid electrolyte and the metal layer to limit contact between the metal layer and the solid electrolyte, which would otherwise increase the resistance of the capacitor. The carbonaceous layer may be formed from a variety of known carbonaceous materials, such as graphite, activated carbon, carbon black, etc. The thickness of the carbonaceous layer is typically within the range of from about 1 μm to about 50 μm, in some embodiments from about 2 μm to about 30 μm, and in some embodiments, from about 5 μm to about 10 μm. Likewise, the thickness of the metal layer is typically within the range of from about 1 μm to about 100 μm, in some embodiments from about 5 μm to about 50 μm, and in some embodiments, from about 10 μm to about 25 μm.

III. Multi-Layered Protective Coating

The capacitor of the present invention also includes a multi-layered protective coating that includes at least one light reflective layer and at least one stress dissipation layer. The light reflective layer overlies the solid electrolyte and the stress dissipation layer overlies the light reflective layer. It should be understood that the use of the term "overlies" herein means simply that the particular coating or layer is applied after the preceding layer. Some portion of the coating or layer may, however, intermix or flow through the preceding layer such that the coating or layer does not strictly cover the entire preceding coating or layer. For example, some portion of the light reflective layer may pass into the pores of the anode body where no solid electrolyte is located. Nevertheless, the light reflective layer still overlies the solid electrolyte. Furthermore, the term "overlies" does not preclude the use of additional layers between the preceding layer. For example, one or more layers may be applied between the solid electrolyte and the protective coating, yet the coating is still considered to overlie the solid electrolyte. In one particular embodiment, as described above, an external coating (e.g., carbonaceous and metal layers) is positioned between the solid electrolyte and the protective coating.

A. Light Reflective Layer

The light reflective layer is configured to reflect certain types of incident light (e.g., laser light) so that it does not substantially contact the solid electrolyte to limit potential carbonization. The light reflective layer generally contains particles having a relatively high index of refraction, such as about 1.7 or more, in some embodiments about 2.0 or more, in some embodiments about 2.2 or more, and in some embodiments, about 2.4 or more. To optimize the electrical properties of the capacitor, it is also typically desired that the light reflective layer is non-metallic and optionally, nonconductive. In this regard, the reflective particles are typically formed from a dielectric material, such as inorganic particles, e.g., calcium carbonate, magnesium carbonate, barium carbonate, magnesium sulfate, barium sulfate, calcium sulfate, zinc oxide, zinc sulfide, magnesium oxide, calcium oxide, titanium oxide, alumina, aluminum hydroxide, hydroxyapatite, silica, mica, talc, kaolin, clay, glass powder, zeolite, and so forth; organic particles; and so forth. Particularly suitable dielectric particles for use in the light reflective layer include rutile titanium dioxide (refractive index of about 2.73), anatase titanium dioxide (refractive index of about 2.55), zinc sulfide (refractive index of about 2.32), and zinc oxide (refractive index of 2.0).

The reflective particles typically possess a low content of coloring elements such as vanadium, iron, niobium, copper, and manganese, to minimize their light absorbing capacity. For example, titanium dioxide having a vanadium content of 5 ppm or less may be employed. Such particles may be produced by a chlorine process in which rutile ore composed mainly of titanium oxide is reacted with chlorine gas in a high temperature oven at about 1,000° C. to generate titanium tetrachloride. Then, the titanium tetrachloride is burned with oxygen to form high purity titanium oxide. Although typically possessing a low content of coloring elements, the particles may nevertheless be applied with a treatment to improve other properties (e.g., disperibility). Examples of such treatments include fatty acids (e.g., stearic acid), fatty acid esters, etc.

The particle size of the reflective particles may be selected to optimize light scattering of the layer. For example, the particle size (D) at which the maximum scattering power is seen for a high refractive index particle may be estimated by the following formula:

$$D = \frac{2\lambda}{\pi(n_1 - n_2)}$$

wherein, $\gamma$ is the wavelength of the incident light, $n_1$ is the refractive index of the particle, and $n_2$ is the refractive index of the continuous phase of the layer (e.g., the refractive index of water is about 1.33). Nd:YAG lasers, for example, typically emit light with a wavelength of 1064 nm in the infrared spectrum. At this wavelength, the estimated optimal scattering particle sizes for rutile and anatase titanium dioxide are about 0.47 μm and about 0.55 μm, respectively. In light of the above, the reflective particles of the present invention may be selected to have an average particle size ranging from about 0.01 to about 5 μm, in some embodiments from about 0.05 to about 2 μm, and in some embodiments, from about 0.1 to about 1 μm.

To form the light reflective layer, the reflective particles are generally dispersed in a solvent. Any solvent of a variety of solvents may be employed, such as water; glycols (e.g., propylene glycol, butylene glycol, triethylene glycol, hexylene glycol, polyethylene glycols, ethoxydiglycol, and dipropyleneglycol); glycol ethers (e.g., methyl glycol ether, ethyl glycol ether, and isopropyl glycol ether); ethers (e.g., diethyl ether and tetrahydrofuran); alcohols (e.g., methanol, ethanol, n-propanol, iso-propanol, and butanol); triglycerides; ketones (e.g., acetone, methyl ethyl ketone, and methyl isobutyl ketone); esters (e.g., ethyl acetate, butyl acetate, diethylene glycol ether acetate, and methoxypropyl acetate); amides (e.g., dimethylformamide, dimethylacetamide, dimethylcaprylic/capric fatty acid amide and N-alkylpyrrolidones); nitriles (e.g., acetonitrile, propionitrile, butyronitrile and benzonitrile); sulfoxides or sulfones (e.g., dimethyl sulfoxide (DMSO) and sulfolane); and so forth. One particular benefit of the present invention is that aqueous solvents (e.g., water) may be employed. In fact, water may constitute about 20 wt. % or more, in some embodiments, about 50 wt. % or more, and in some embodiments, about 75 wt. % to 100 wt. % of the solvent(s) used in the coating formulation.

The total concentration of solvent(s) employed in the coating formulation may vary, but is typically from about 10 wt. % to about 90 wt. %, in some embodiments from about 20 wt. % to about 85 wt. %, and in some embodiments, from about 40 wt. % to about 80 wt. % of the coating formulation. Of course, the specific amount of solvent(s) employed depends in part on the desired solids content and/or viscosity of the coating formulation. For example, the solids content may range from about 10% to about 90% by weight, more particularly, between about 15% to about 80% by weight, and even more particularly, between about 20% to about 60% by weight. By varying the solids content of the coating formulation, the presence of the light reflective particles in the coating formulation may be controlled. For example, to form a coating formulation with a higher level of light reflective particles, the formulation may be provided with a relatively high solids content so that a greater percentage of the particles are incorporated into the layer. In addition, the viscosity of the coating formulation may also vary depending on the application method and/or type of solvent employed. The viscosity is typically, however, from about 5 to about 500 centipoise, in some embodiments from about 10 to about 450 centipoise, and in some embodiments, from about 50 to about 400 centipoise, as measured with a Brookfield DV-1 viscometer using Spindle No. 2 operating at 30 rpm and 25° C. If desired, thickeners or other viscosity modifiers may be employed in the coating formulation to increase or decrease viscosity.

The coating formulation may also employ a binder to help retain the light reflective particles on the capacitor after the solvent is removed from the coating formulation. Although any binder may be employed, organic binders are particularly suitable for use in the present invention. Examples of such binders may include, for instance, poly(vinyl butyral); poly (vinyl acetate); poly(vinyl alcohol); poly(vinyl pyrollidone); cellulosic polymers, such as carboxymethylcellulose, methyl cellulose, ethyl cellulose, hydroxyethyl cellulose, and methylhydroxyethyl cellulose; atactic polypropylene, polyethylene; polyethylene glycol (e.g., Carbowax from Dow Chemical Co.); silicon polymers, such as poly(methyl siloxane), poly(methylphenyl siloxane); polystyrene, poly(butadiene/styrene); polyamides, polyimides, and polyacrylamides, high molecular weight polyethers; copolymers of ethylene oxide and propylene oxide; fluoropolymers, such as polytetrafluoroethylene, polyvinylidene fluoride, and fluoro-olefin copolymers; and acrylic polymers, such as sodium polyacrylate, poly(lower alkyl acrylates), poly(lower alkyl methacrylates) and copolymers of lower alkyl acrylates and methacrylates. Particularly suitable binders for use in the coating formulation are latex polymer binders having a glass transition temperature of about 50° C. or less so that the flexibility of the resulting coating formulation is not substantially restricted. Moreover, the latex polymer also typically has a glass transition temperature of about −35° C. or more to minimize its tackiness. Some suitable polymer lattices that may be utilized in the present invention may be based on polymers such as, but are not limited to, styrene-butadiene polymers, polyvinyl acetate homopolymers, vinyl-acetate ethylene copolymers, vinyl-acetate acrylic or methacrylic polymers, ethylene-vinyl chloride polymers, ethylene-vinyl chloride-vinyl acetate polymers, polyvinyl chloride polymers, nitrile polymers, and any other suitable latex polymer known in the art.

In addition to binders, the coating formulation may also include other components that facilitate the application of the light reflective particles to the capacitor. For example, one or more dispersants may be employed in the coating formulation to reduce the surface tension of the suspension. One class of suitable dispersants includes anionic polymers having acid groups or salts thereof. Such polymers, for example, typically contain at least one ethylenically unsaturated acid containing monomer and optionally at least one ethylenically unsaturated nonionic monomer. Suitable acid monomers include monomers having carboxylic acid groups, such as acrylic acid, methacrylic acid, itaconic acid, fumaric acid, crotonic acid, maleic acid, monomethyl itaconate, monomethyl fumarate, and monobutyl fumarate; anhydrides, such as maleic anhydride and itaconic anhydride; or combinations thereof. Suitable ethylenically unsaturated monomers include alkyl esters of (meth)acrylic acid, such as ethyl acrylate, butyl acrylate, and methyl methacrylate; hydroxy esters of (meth) acrylic acid, such as hydroxyethyl methacrylate, hydroxyethyl acrylate, hydroxypropyl acrylate, and hydroxypropyl methacrylate; aromatic monomers, such as styrene and α-methyl styrene; and alkenes, such as di-isobutylene.

A wetting agent, or surfactant, may also be employed in the coating formulation to facilitate the formation of homogeneously uniform coating formulations having desirable spreadibility. Suitable surfactants may include cationic surfactants, nonionic surfactants, anionic surfactants, amphoteric surfactants, and so forth. Nonionic surfactants, for instance, may have a hydrophobic base, such as a long chain alkyl group or an alkylated aryl group, and a hydrophilic chain comprising a certain number (e.g., 1 to about 30) of ethoxy and/or propoxy moieties. Examples of some classes of nonionic surfactants that can be used include, but are not limited to, ethoxylated alkylphenols, ethoxylated and propoxylated fatty alcohols, polyethylene glycol ethers of methyl glucose, polyethylene glycol ethers of sorbitol, ethylene oxide-propylene oxide block copolymers, ethoxylated esters of fatty ($C_8$-$C_{18}$) acids, condensation products of ethylene oxide with long chain amines or amides, condensation products of ethylene oxide with alcohols, and mixtures thereof. Particularly suitable nonionic surfactants may include the polyethylene oxide condensates of one mole of alkyl phenol containing from about 8 to 18 carbon atoms in a straight- or branched-chain alkyl group with about 5 to 30 moles of ethylene oxide. Specific examples of alkyl phenol ethoxylates include nonyl condensed with about 9.5 moles of ethylene oxide per mole of nonyl phenol, dinonyl phenol condensed with about 12 moles of ethylene oxide per mole of phenol, dinonyl phenol condensed with about 15 moles of ethylene oxide per mole of phenol and diisoctylphenol condensed with about 15 moles of ethylene oxide per mole of phenol. Such compounds are commercially available under the trade name Triton™ CF-100 from Dow Chemical Co. of Midland, Mich.

Plasticizers may also be employed in the coating formulation to enhance the film-forming characteristics of the coating formulation. Plasticizers are well-known and a wide range of plasticizers can be employed. Examples of typical plasticizers include mineral oil; glycols, such as propylene glycol; phthalic esters, such as dioctyl phthalate and benzyl butyl phthalate; and long-chain aliphatic acids, such as oleic acid and stearic acid; and mixtures thereof.

The concentration of each component of the coating formulation may vary depending on the amount of heat desired, the wet pick-up of the application method utilized, etc. For example, the amount of the light reflective particles within the coating formulation may range from about 10 wt. % to about 80 wt. %, in some embodiments from about 20 wt. % to about 75 wt. %, and in some embodiments, from about 25 wt. % to about 50 wt. %. Binder(s) may also constitute from about 0.01 wt. % to about 20 wt. %, in some embodiments from about 0.1 wt. % to about 15 wt. %, and in some embodiments, from about 0.5 wt. % to about 10 wt. % of the coating formulation. Other components, such as dispersants, surfactants, plasticizers, etc., may each constitute from about 0.001 wt. % to about 10 wt. %, in some embodiments from about 0.01 wt. % to about 5 wt. %, and in some embodiments from about 0.1 wt. % to about 3 wt. % of the coating formulation.

Regardless of the particular manner in which it is formed, the coating formulation is deposited onto a surface of the capacitor using known methods such as, dipping, spraying, printing, molding, extrusion, etc. For example, the capacitor may simply be dipped into the coating formulation to the desired level. The coated capacitor may then be allowed to dry, either under ambient conditions or in a heating step, so that most, if not all, of the solvent is removed. For example, the capacitor may be heated in one or more steps at a temperature of from about 50° C. to about 300° C., in some embodiments from about 60° C. to about 200° C., and in some embodiments, from about 70° C. to about 150° C. Heating may occur in air, or under a controlled atmosphere (e.g., under vacuum). The final dried coating typically possesses the reflective particles in an amount of about 80 wt. % to 100 wt. %, in some embodiments, from about 85 wt. % to about 99.9 wt. %, and in some embodiments, from about 90 wt. % to about 99 wt. %. To optimize its reflectivity, the coating also typically has a relatively thin thickness, such as about 100 µm or less, in some embodiments from about 20 to about 80 µm, and in some embodiments, from about 30 to about 60 µm.

B. Stress Dissipation Layer

The stress dissipation layer of the protective coating can, among other things, help dissipate stresses experienced by the capacitor (e.g., during encapsulation, reflow, etc.) so that they are not as likely to cause damage to the solid electrolyte. The stress dissipation layer can also be relatively porous in nature so that humidity trapped in the capacitor (e.g., solid electrolyte) can escape and diminish the pressure that might otherwise be transferred to the solid electrolyte. Typically, it is desired that the stress dissipation layer is also electrically conductive to enhance conductive attachment to termination, another capacitor element, etc. To accomplish these and other functions, the stress dissipation layer generally includes a plurality of electrically conductive metal particles. Examples of suitable metals for use in forming the particles include, for instance, nickel, copper, gold, silver, silver coated copper, silver coated nickel, tin, lead, palladium, aluminum, etc., as well as alloys thereof. Silver is particularly suitable for use in the present invention. The particles may be applied to the capacitor element using any technique known in the art, such as in the form of a paste that is applied (e.g., coated, dipped, sprayed, printed, etc.) to a surface of the capacitor element. The paste may be then cured or dried to remove any solvent present therein.

The metal particles may be small enough so that they do not adversely impact the volumetric efficiency of the capacitor, yet large enough to ensure that the layers attains the minimum thickness needed to achieve the desired stress dissipation and to help ensure a reliable mechanical connection to another part. In most embodiments, the metal particles thus have a median diameter of from about 0.1 µm to about 50 µm, in some embodiments from about 0.2 µm to about 10 µm, and in some embodiments, from about 0.5 µm to about 5 µm. The term "median" particle size as used herein refers to the "$D_{50}$" particle size distribution of the particles. As is well known in the art, the designation "$D_{50}$" means that at least 50% of the particles have the size indicated. The thickness of the resulting stress dissipation layer is likewise typically from about 1 to about 100 µm, in some embodiments from about 10 to about 70 µm, and in some embodiments, from about 20 to about 50 µm. The total thickness of the multi-layered protective coating may also range from about 10 µm to about 300 µm, in some embodiments from about 30 to about 200 µm, and in some embodiments, from about 50 to about 150 µm.

Generally speaking, the multi-layered protective coating may be applied to any surface of the capacitor so that it can reduce contact of the solid electrolyte with incident light (e.g., laser). For example, the protective coating may be located on the top, bottom, and/or side surfaces of the capacitor. The protective coating may likewise be located on the front and/or rear surface of the capacitor. The light reflective layer may cover the entire area or only a portion of the area of the surface to which it is applied. In one embodiment, for example, the protective coating covers about 30% or more, in some embodiments about 40% or more, and in some embodiments, about 50% or more of a surface of the capacitor to which it is applied.

Figure 1:
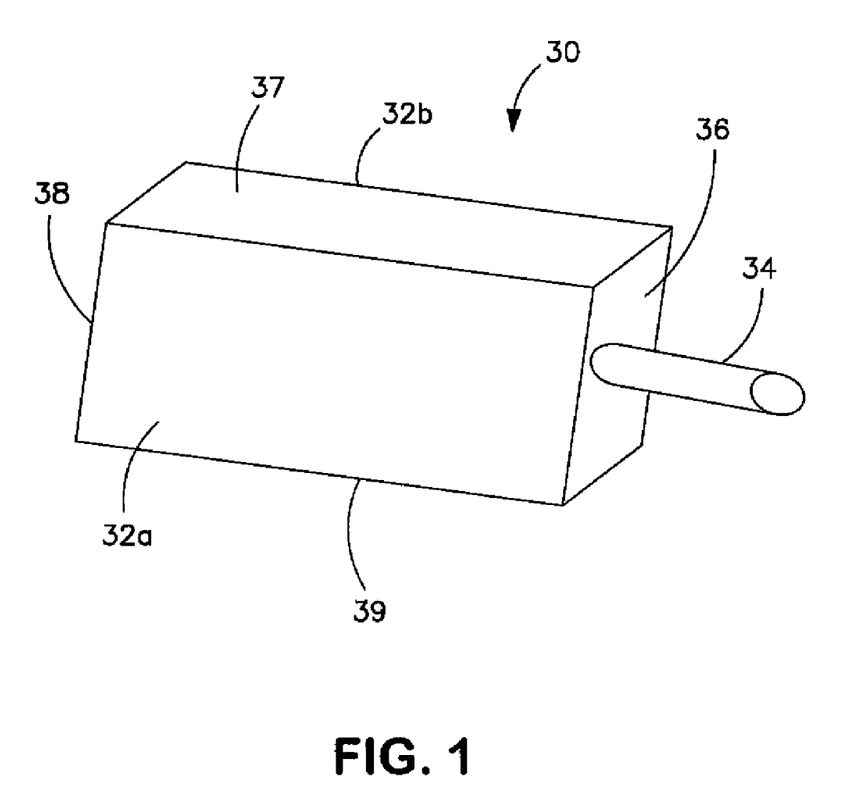
FIG. 1 is a perspective view of one embodiment of the solid electrolytic capacitor element of the present invention.
Figure 2:
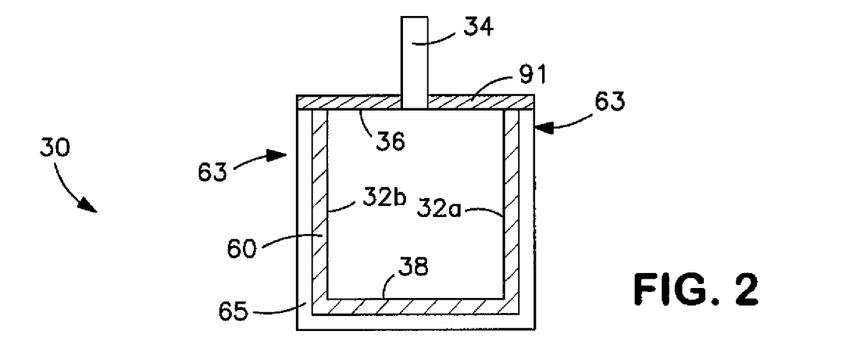
FIG. 2 is a top, cross-sectional view of the capacitor of FIG. 1.

Referring to FIGS. 1-2, for example, one embodiment of a capacitor 30 is shown that has a generally rectangular shape and contains a front surface 36, rear surface 38, top surface 37, bottom surface 39, first side surface 32a, and second side surface 32b. An anode wire 34 extends from the front surface 36 of the capacitor 30 in a longitudinal direction ("y" direction). Although not expressly shown, the capacitor 30 contains an anodically oxidized anode body and a cathode that includes a solid electrolyte, graphite layer overlying the solid electrolyte, and a silver layer overlying the graphite layer. Typically, the solid electrolyte overlies the anode body at each surface of the capacitor 30, i.e., at the front surface 36, rear surface, 38, top surface 37, bottom surface 39, and side surfaces 32a and 32b. Further, the graphite and silver layers typically overly the solid electrolyte at each surface of the capacitor 30, except for the front surface 36. Thus, in this embodiment, the front surface 36 contains the solid electrolyte, but is generally free of the graphite and silver layers. Of course, it should be understood that such layers may be applied to any surface of the capacitor, and need not be applied in the manner illustrated.

Figure 3:
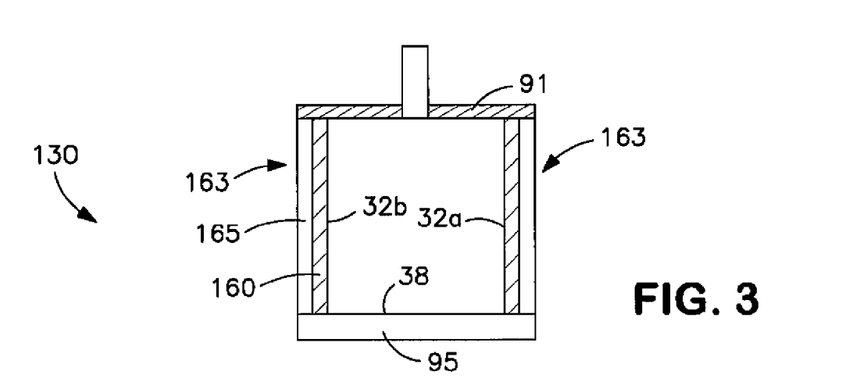
FIG. 3 is a top, cross-sectional view of another embodiment of the solid electrolytic capacitor element of the present invention.

The capacitor 30 also contains a protective coating 63 formed according to the present invention, which includes a light reflective layer 60 and a stress dissipation layer 65. In this particular embodiment, the protective coating 63 overlies the solid electrolyte at the rear surface 38, top surface 37, bottom surface 39, first side surface 32a, and second side surface 32b. Of course, it should be understood that the protective coating 63 need not be located on such surfaces of the capacitor 30. Referring to FIG. 3, for example, a capacitor 130 is shown that includes a protective coating 163 formed from a light reflective layer 160 and a stress dissipation layer 165. In this particular embodiment, the protective coating 163 is located only at the first side surface 32a and second side surface 32b of the capacitor 130.

Figure 4:
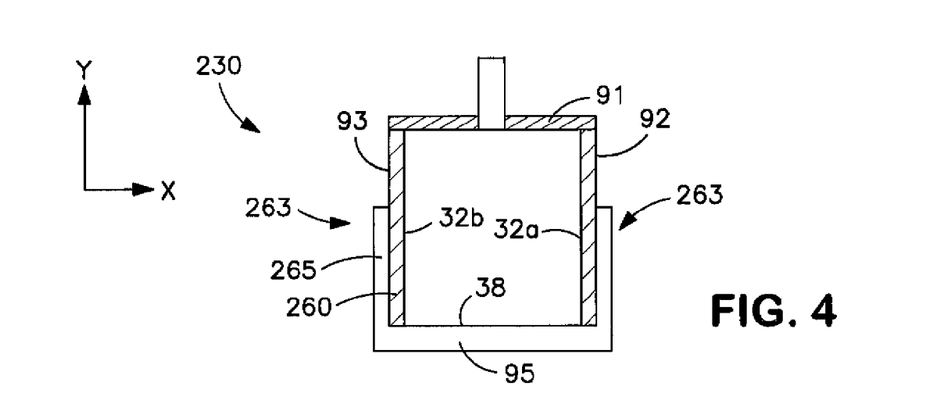
FIG. 4 is a top, cross-sectional view of yet another embodiment of the solid electrolytic capacitor element of the present invention.

Regardless of the where it is located, the protective coating may cover any desired portion of the surface. In the embodiments of FIGS. 1-3, for example, the protective coatings 63 and 163 cover substantially all of the surfaces on which they are located, such as about 90% or more, and in some embodiments, about 95% or more. Once again, however, this is merely optional and the coating need not cover such a substantial portion of the surface. Referring to FIG. 4, for example, one embodiment of a capacitor 230 is shown that includes a protective coating 263 formed from a light reflective layer 260 and a stress dissipation layer 265. In this particular embodiment, the coating 263 covers only about 40% of the area of each of the side surfaces 32a and 32b. Even when coating only a portion of the surface, the present inventors have discovered that the protective coating can still help provide the desired properties to the capacitor.

While the multi-layered protective coating is employed on at least one surface of the capacitor, it should be understood that an individual layer of the coating may be separately employed at other locations of the capacitor. For example, in certain embodiments, a light reflective layer may be employed without the stress dissipation layer. This may useful in those regions of the capacitor where light reflectance is of a greater concern than the problems addressed by the overall protective coating, such as stress dissipation, humidity entrapment, etc. In the embodiments illustrated in FIGS. 2-4, for example, a second light reflective layer 91 is also employed that is located at the front surface 36 of the capacitor. Typically, the light reflective layer 91 covers substantially all of the front surface 36, such as about 90% or more, and in some embodiments, about 95% or more of the front surface 36. In the embodiment shown in FIG. 4, light reflective layers 92 and 93 may also be employed on side surfaces 32a and 32b, respectively, at those locations where the entire protective coating 263 is not located. If desired, the stress dissipation layer used in the protective coating may also be employed as an individual layer, without the light reflective layer. For example, because the rear surface is not generally contacted with incident light during manufacture, a light reflective layer may not be needed. Nevertheless, the properties imparted by the stress dissipation layer (e.g., stress dissipation) may still be desired. Thus, in the embodiments shown in FIGS. 3-4, a second stress dissipation layer 95 may be located at the rear surface 38 of the capacitor, directly adjacent to the cathode.

Figure 5:
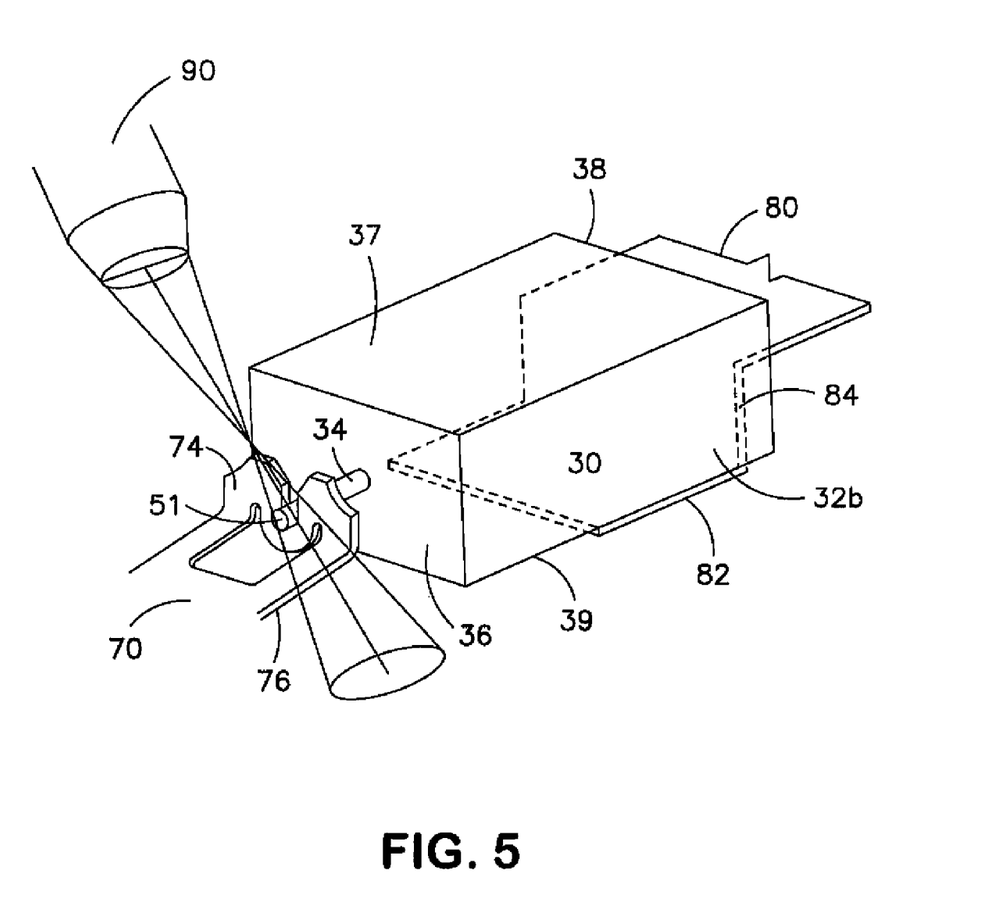
FIG. 5 is a schematic illustration of one embodiment in which the capacitor element of FIG. 1 is laser welded to an anode termination.

Regardless of the particular manner in which the capacitor is formed, it can be connected to termination as is well known in the art. For example, anode and cathode termination may be electrically connected to the anode wire and the cathode, respectively. The specific configuration of the terminations may vary as is well known in the art. Referring to FIG. 5, for example, one embodiment is shown that includes an anode termination 70 and a cathode termination 80. In this particular embodiment, the cathode termination contains a first portion 82 positioned substantially perpendicular to a second portion 84. The first portion 82 is in electrical contact with the lower surface 39 of the capacitor 30 (FIG. 1) and the second portion 84 is in electrical contact with the rear surface 38 of the capacitor 30. To attach the capacitor 30 to the cathode termination 80, a conductive adhesive may be employed as is known in the art. The conductive adhesive may include, for instance, conductive metal particles contained with a resin composition. The metal particles may be silver, copper, gold, platinum, nickel, zinc, bismuth, etc. The resin composition may include a thermoset resin (e.g., epoxy resin), curing agent (e.g., acid anhydride), and coupling agent (e.g., silane coupling agents). Suitable conductive adhesives are described in U.S. Patent Application Publication No. 2006/0038304 to Osako, et al., which is incorporated herein in its entirety by reference thereto for all purposes.

The anode termination 70 contains a first portion 76 positioned substantially perpendicular to a second portion 74. The second portion 74 contains a region that carries the anode wire 34. In the illustrated embodiment, the region 51 possesses a "U-shape" for further enhancing surface contact and mechanical stability of the wire 34. The anode wire 34 is then welded to the region 51 with a laser 90. As illustrated in FIG. 5, contact of the laser beam may result in the reflection of light towards the capacitor 30. Due to the presence of the protective coating in accordance with the present invention, however, the light may not significantly damage or carbonize the solid electrolyte.

Figure 6:
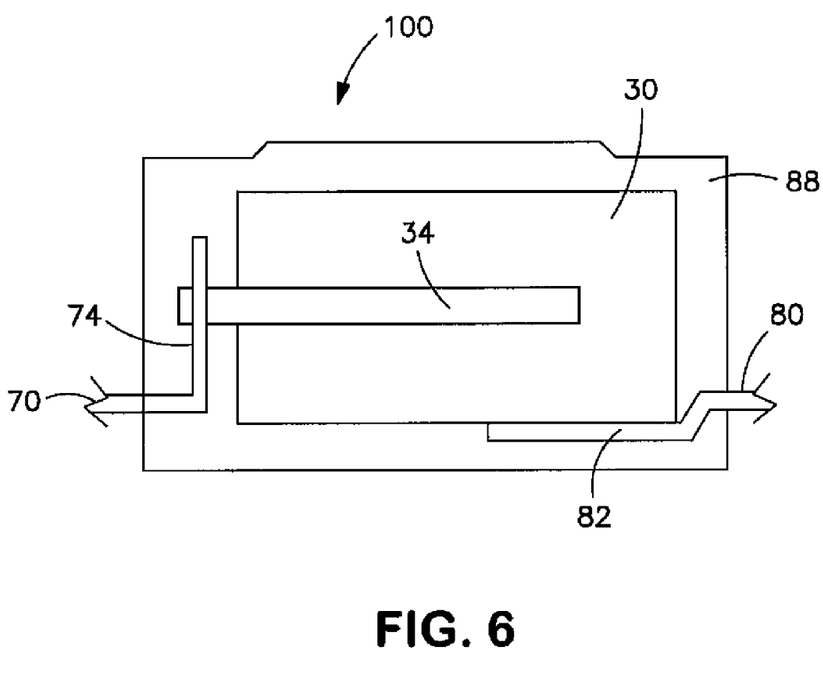
FIG. 6 is a cross-sectional view of the capacitor element of FIG. 1 encapsulated within a casing.

Once the capacitor is attached to the terminations, it is enclosed within a resin casing, which may then be filled with silica or any other known encapsulating material. The width and length of the case may vary depending on the intended application. However, the overall thickness of the casing is typically small so that the resultant assembly may be readily incorporated into low profile products (e.g., "IC cards"). For example, the thickness of the casing may range from about 4.0 millimeters or less, in some embodiments, from about 0.1 to about 2.5 millimeters, and in some embodiments, from about 0.15 to about 2.0 millimeters. Suitable casings may include, for instance, "A", "B", "H", or "T" cases (AVX Corporation). Referring to FIG. 6, for example, one particular embodiment of such an encapsulating case for a capacitor assembly 100 is shown as element 88. The encapsulating case 88 provides additional structural and thermal protection for the capacitor assembly 100. After encapsulation, exposed portions of the respective anode and cathode terminations may be aged, screened, and trimmed. If desired, the exposed portions may be optionally bent twice along the outside of the casing 88 (e.g., at an approximately 90° angle).

As a result of the present invention, a capacitor may be formed that exhibits excellent electrical properties. For example, the capacitor of the present invention typically has an ESR less than about 1000 milliohms (mohms), in some embodiments less than about 500 mohms, and in some embodiments, less than about 100 mohms. The equivalent series resistance of a capacitor generally refers to the extent that the capacitor acts like a resistor when charging and discharging in an electronic circuit and is usually expressed as a resistance in series with the capacitor. In addition, the resulting leakage current, which generally refers to the current flowing from one conductor to an adjacent conductor through an insulator, can be maintained at relatively low levels. For example, the numerical value of the normalized leakage current of a capacitor of the present invention is, in some embodiments, less than about 0.1 $\mu A/\mu F*V$, in some embodiments less than about 0.01 $\mu A/\mu F*V$, and in some embodiments, less than about 0.001 $\mu A/\mu F*V$, wherein $\mu A$ is microamps and $\mu F*V$ is the product of the capacitance and the rated voltage.

The present invention may be better understood by reference to the following example.

Test Procedures

Leakage Current:
Leakage current ("DCL") was measured using a leakage test set that measures leakage current at a temperature of 25° C. and at the rated voltage after a minimum of 60 seconds. Leakage current was also measured after conducting a conventional lead-free reflow profile and measured after 30 minutes of relaxation at a temperature of 25° C. and at rated voltage.

EXAMPLE 1

A tantalum anode with a size of 1.8 mm×2.4 mm×1.2 mm was anodized at 16V in a liquid electrolyte to 150 μF. A conductive polymer coating was then formed by dipping the anode into a butanol solution of iron (III) toluenesulfonate (Clevios™ C, H.C. Starck) for 5 minutes and consequently into 3,4-ethylenedioxythiophene (Clevios™ M, H.C. Starck) for 1 minute. After 45 minutes of polymerization, a thin layer of poly(3,4-ethylenedioxythiophene) was formed on the surface of the dielectric. The parts were washed in methanol to remove reaction by-products, anodized in a liquid electrolyte, and washed again in methanol. The polymerization cycle was repeated 12 times. The parts were then coated by graphite and silver and assembled by gluing the anodes into a leadframe pocket, cutting and laser welding the anode wire into the leadframe upstand, and molding the capacitor.

EXAMPLE 2

A tantalum anode with a size of 1.8 mm×2.4 mm×1.2 mm was anodized at 16V in a liquid electrolyte to 150 μF. A conductive polymer coating was then formed by dipping the anode into a butanol solution of iron (III) toluenesulfonate (Clevios™ C, H.C. Starck) for 5 minutes and consequently into 3,4-ethylenedioxythiophene (Clevios™ M, H.C. Starck) for 1 minute. After 45 minutes of polymerization, a thin layer of poly(3,4-ethylenedioxythiophene) was formed on the surface of the dielectric. The parts were washed in methanol to remove reaction by-products, anodized in a liquid electrolyte, and washed again in methanol. The polymerization cycle was repeated 12 times. The parts were then coated by graphite and silver.

The parts were then coated with a multi-layered protective coating. To form the light reflective layer, a composition was obtained from Primalex a.s. (Czech Republic) that contained 58.5 wt. % water, 38.5 wt. % titanium dioxide, 0.31 wt. % hydroxyethylcellulose, 1.24 wt. % polyvinylacetate dispersion, 0.12 wt. % sodium polysulfate, 0.87 wt % polyacrylic acid salts, 0.3 wt. % stabilizers, and 0.19 wt. % defoaming agents. The parts were dipped into the composition over it shoulder to fully cover the upper surface. Within two minutes after application of the reflective coating, the parts were 3 times blotted to the paper and dried at 125° C. for 30 minutes. To form the stress dissipation layer, a composition of Thermoset™ K611-14 was obtained from Lord Co. (USA) that contained 72 wt. % silver, 10 wt. % acrylic resin, and 18 wt. % butyl acetate (viscosity of 500 cps at 25° C. and volume resisitivity of $1.10^4$ at 25° C.). The parts were dipped into the composition, retained at ambient temperature for 60 minutes, and finally dried at 125° C. for 30 minutes. The parts were then assembled by gluing the anodes into a leadframe pocket, cutting and laser welding the anode wire into the leadframe upstand, and molding the capacitor.

The finished capacitors of Examples 1 and 2 were then tested for electrical performance of leakage current. Also, to determine the quality of electrical performance after reflow, the leakage current measurements were re-measured. The medial results of leakage current (before and after molding) are set forth below.

|  | DCL [μA] before molding | DCL [μA] @ after molding and annealing | # of part failures after $1^{st}$ reflow (DCL > 180 μA) [ppm] | # of part failures after $2^{nd}$ reflow (DCL > 180 μA) [ppm] |
| --- | --- | --- | --- | --- |
| Example 1 | 2.2 | 6.8 | >500 | >500 |
| Example 2 | 2.3 | 5.5 | <100 | <10 |

These and other modifications and variations of the present invention may be practiced by those of ordinary skill in the art, without departing from the spirit and scope of the present invention. In addition, it should be understood that aspects of the various embodiments may be interchanged both in whole or in part. Furthermore, those of ordinary skill in the art will appreciate that the foregoing description is by way of example only, and is not intended to limit the invention so further described in such appended claims.

What is claimed is:

1. A solid electrolytic capacitor element comprising:
   an anode body containing a valve metal composition;
   a dielectric overlying the anode body;
   a solid electrolyte overlying the dielectric; and
   a multi-layered protective coating that includes a light reflective layer and a stress dissipation layer, wherein the light reflective layer overlies the solid electrolyte and the stress dissipation layer overlies the light reflective layer, wherein the light reflective layer contains a plurality of non-metallic reflective particles, and wherein the stress dissipation layer includes a plurality of metal particles.

2. The solid electrolytic capacitor element of claim 1, wherein the reflective particles have an index of refraction of about 1.7 or more.

3. The solid electrolytic capacitor element of claim 1, wherein the reflective particles include inorganic particles.

4. The solid electrolytic capacitor element of claim 3, wherein the inorganic particles include titanium dioxide.

5. The solid electrolytic capacitor element of claim 4, wherein the titanium dioxide is rutile titanium dioxide, anatase titanium dioxide, or a mixture thereof.

6. The solid electrolytic capacitor element of claim 1, wherein the reflective particles having an average size of from about 0.1 to about 1 μm.

7. The solid electrolytic capacitor element of claim 1, wherein the reflective particles constitute from about 80 wt. % to 100 wt. % of the light reflective layer.

8. The solid electrolytic capacitor element of claim 1, wherein the light reflective layer has a thickness of from about 20 to about 80 μm.

9. The solid electrolytic capacitor element of claim 1, wherein the stress dissipation layer has a thickness of from about 1 to about 100 μm.

10. The solid electrolytic capacitor element of claim 1, wherein the metal particles include silver.

11. The solid electrolytic capacitor element of claim 10, wherein the metal particles have an average size of from about 0.1 to about 50 μm.

12. The solid electrolytic capacitor element of claim 1, further comprising an external coating that is positioned between the solid electrolyte and the multi-layered protective coating, wherein the external coating includes a carbonaceous layer that overlies the solid electrolyte and a metal layer that overlies the carbonaceous layer.

13. The solid electrolytic capacitor element of claim 12, wherein the metal layer includes silver particles.

14. The solid electrolytic capacitor element of claim 1, wherein the capacitor element includes a front surface, rear surface, and at least one side surface extending between the front surface and the rear surface.

15. The solid electrolytic capacitor element of claim 14, wherein the protective coating is located at the side surface.

16. The solid electrolytic capacitor element of claim 15, wherein the protective coating covers substantially the entire side surface.

17. The solid electrolytic capacitor element of claim 15, wherein the protective coating covers only a portion of the side surface.

18. The solid electrolytic capacitor element of claim 14, wherein an additional light reflective layer is located at the front surface of the capacitor element.

19. The solid electrolytic capacitor element of claim 14, wherein an additional stress dissipation layer is located at the rear surface of the capacitor element.

20. The solid electrolytic capacitor element of claim 14, wherein an anode lead extends from the front surface of the capacitor element.

21. The solid electrolytic capacitor element of claim 20, wherein an anode termination is laser welded to the anode lead.

22. The solid electrolytic capacitor element of claim 1, wherein the valve metal composition contains tantalum, niobium, or an electrically conductive oxide thereof.

23. The solid electrolytic capacitor element of claim 1, wherein the solid electrolyte contains a conductive polymer.

24. The solid electrolytic capacitor element of claim 23, wherein the conductive polymer is a substituted polythiophene.

25. The solid electrolytic capacitor element of claim 24, wherein the substituted polythiophene is poly(3,4-ethylenedioxythiophene).

26. The solid electrolytic capacitor element of claim 23, wherein the solid electrolyte is formed from a dispersion of pre-polymerized conductive polymer particles.

27. The solid electrolytic capacitor element of claim 26, wherein the solid electrolyte further comprises a counterion.

28. The solid electrolytic capacitor element of claim 26, wherein the conductive polymer particles are in contact with the dielectric.

29. A solid electrolytic capacitor element comprising:
an anode body containing a valve metal composition, wherein the valve metal composition comprises tantalum, niobium, or an electrically conductive oxide thereof;
a dielectric overlying the anode body;
a solid electrolyte overlying the dielectric, wherein the solid electrolyte includes a substituted polythiophene; and
a protective coating that includes a light reflective layer and a stress dissipation layer, wherein the light reflective layer overlies the solid electrolyte and the stress dissipation layer overlies the light reflective layer, wherein the light reflective layer contains a plurality of inorganic oxide particles, and wherein the stress dissipation layer includes a plurality of metal particles.

30. The solid electrolytic capacitor element of claim 29, wherein the substituted polythiophene is poly(3,4-ethylenedioxythiophene).

31. The solid electrolytic capacitor element of claim 29, wherein the solid electrolyte is formed from a dispersion of pre-polymerized substituted polythiophene particles.

32. The solid electrolytic capacitor element of claim 29, wherein the inorganic oxide particles include titanium dioxide.

33. The solid electrolytic capacitor element of claim 29, wherein the metal particles are silver particles.

* * * * *